June 2, 1925.                    L. J. WILLIAMS                    1,539,890
STAKING TOOL
Filed June 11, 1923
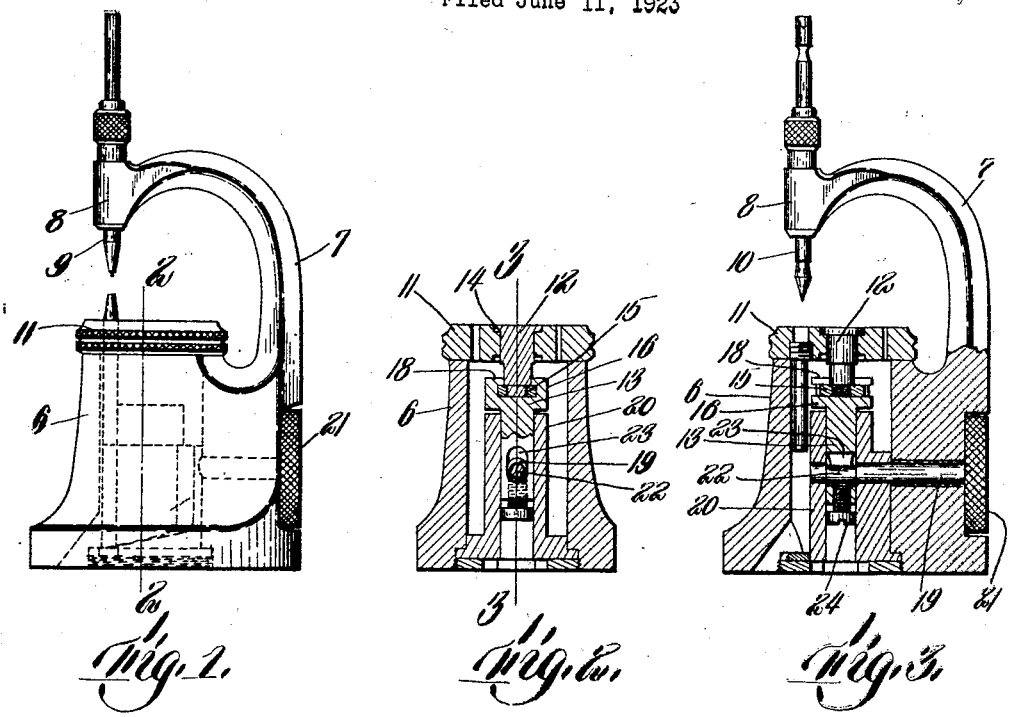
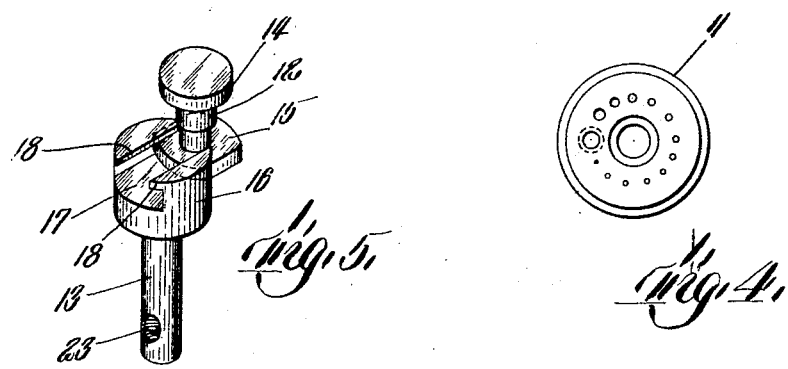
Inventor
Lester J. Williams
by Wright, Brown, Quinby & May
attys Patented June 2, 1925.

1,539,890

UNITED STATES PATENT OFFICE.

LESTER J. WILLIAMS, OF LEBANON, NEW HAMPSHIRE, ASSIGNOR TO KENDRICK & DAVIS CO., OF LEBANON, NEW HAMPSHIRE, A CORPORATION OF NEW HAMPSHIRE.

STAKING TOOL.

Application filed June 11, 1923. Serial No. 644,591.

*To all whom it may concern:*

Be it known that I, LESTER J. WILLIAMS, a citizen of the United States, residing at Lebanon, in the county of Grafton and State of New Hampshire, have invented new and useful Improvements in Staking Tools, of which the following is a specification.

The present invention relates to that class of tools used in the watchmaker's art and known as "staking" tools. Its primary and main object is to provide such a tool with a universally adjustable die or table, or, as it may be called, a floating die, to the end that the dies of all tools of the same size and design may be interchangeable with one another and therefore made and assembled in the first instance, and afterwards renewed, with greater ease, and less cost and inconvenience, than heretofore.

The main parts of a staking tool, such as is commonly used by watchmakers, are a base, a neck rising from one side of the base and having a head which overlies the other side of the base and is formed with a guideway, a rotatable table or die, and means for securing the die in various positions. The die is, in effect, a circular table which rests on the top of the base and is provided with a concentric series of holes of different diameters to receive the parts to be operated on, such as the staffs of watch wheels and the like, or the stems of tools which are used in staking operations.

In staking tools as heretofore made, the pivot about which the die is rotated to bring one or another of its tools in line with the guideway in the head, has been fixed and immovable; that is, there has never been any provision for lateral movement of the die otherwise than that of rotation about a fixed axis. This fact has made it necessary to fit the dies individually to the bases of the particular tools for which they are made, because staking tools are required to be exceedingly accurate and, therefore, all of the holes in the die must be capable of being brought into exact central alinement with the guideway in the head. It has been necessary, then, in order to avoid the effects of unavoidable inaccuracies in the construction of the base, with its pivot for the die and the guideway in its overhanging head, to fit the die to the base before drilling the holes in it, and then to drill one of the holes, with the die in place on the base, by running the drill through the guideway in the head. This practice was necessary in order to secure the exactly correct radial distance of the hole from the axis of the die. Thereafter the rest of the holes required could be drilled by the use of a machine tool and the die could be finished; but the necessity for thus establishing the radial distance of the holes made each die special for its own tool, was a substantial element of cost in the manufacture of the tool, and prevented different dies being interchangeably applied to different tools.

It also required the possessor of such a tool, when said tool was in need of repairs by reason of the breaking or wearing out of the die, to return the entire tool to the maker to have a new or repaired die accurately fitted. Such necessity was a cause of substantial expense on account of the special work required, besides being a severe hardship to the owner on account of his being deprived of the use of the tool for an indefinite period.

My purpose has been to reduce the cost of making staking tools in the first instance, and to eliminate the hardship suffered by the owner on account of being deprived of the use of the tool when repairs are necessary, besides reducing the expense to him of making repairs. I have accomplished these purposes by providing a new means for mounting and clamping the dies of staking tools, the immediate result of which is that all the dies may be made by methods suitable for quantity production and all dies for a given style of tool are interchangeable with one another; and the ultimate result of which is the complete accomplishment of the purposes previously stated.

The following specification and the drawings forming a part thereof disclose the preferred embodiment of the invention and illustrate the principles in which the invention which I here claim consists.

In the drawings,—

Figure 1 is a side elevation of the embodiment referred to.

Figure 2 is a cross section on approximately the line 2—2 of Figure 1.

Figure 3 is a section on a plane parallel with the view point of Figure 1 and located approximately on the line 3—3 of Figure 2.

Figure 4 is a plan view of a typical die used with such a staking tool.

Figure 5 is a perspective view showing in detail the means for mounting the rotative pivot of the die in a manner permitting lateral translative displacement as well as rotation of the die.

Like reference characters designate the same parts wherever they occur in all the figures.

The body or frame of the tool comprises a base 6, a neck 7 rising from one side of the base and extending across the same, and a head 8 overhanging the base at the opposite side from the neck and having a guideway through which an operating tool, such as the punch 9 shown in Figure 1, or the centering tool shown in Figure 3, may be passed as usual in tools of this character. The die is shown at 11, and is or may be identical with the dies heretofore used with staking tools. It rests at its peripheral portion on the upper surface of the base, which surface is finished in a plane perpendicular to the guideway and is so disposed as to afford a firm and rigid support.

The new step of the invention is embodied, in the form illustratively here shown, in the two-part pivot and clamping bar for the die, the same comprising a pin or stud 12, which is the pivot proper, and a bar 13 which is coupled to the pivot stud and extends downward in the base into connection with a suitable clamping device.

The pivot stud 12 fits rotatably the central opening in the die and is provided with a flange 14 which overlaps a shoulder within the upper end of such opening. Connection is made between this stud and the clamping bar 13 by a disk 15 on the pivot stud and a head 16 on the bar. Such disk fits freely in an undercut T-slot 17 in the head 16, the lips 18 of which slot overlap the opposite edges of the disk 15 and apply thereto the force required to bind the die upon the base when adjusted. This disk is secured in any suitable way to the pivot stud and is here shown as being screwed on the lower end of the stud and against a shoulder formed upon the latter.

A suitable means for clamping or binding the die is here shown as consisting of a shaft 19 passing transversely through the base and also through a tubular core 20 mounted therein to receive the clamping bar. Said shaft has a head 21 on its outer end by which it may be turned manually and its inner portion has bearings in the core on opposite sides of the bar 13, while an intermediate eccentric portion 22 passes through an elongated slot 23 in the bar and engages an adjustable abutment 24 which is screwed through the lower end of the bar and into said slot. By turning the shaft 19 in one direction or the other, the die may be clamped against the base by the force exerted by the eccentric 22 through the abutment 24, bar 13 and pivot stud; and the die may be released by turning the shaft in the opposite direction.

It may be noted that the slot 17, when the parts of the tool are properly assembled, extends in substantially the same direction as the plane common to the axis of the die and the axis of the guideway in the head. Hence the sliding connection between the pivot and clamping bar thus provided enables the whole die to be moved bodily laterally in a direction transverse to the guideway, and thereby any hole in the die may be centered correctly with the said guideway and with the tool which operates therein, even though the radial distance of the hole from the axis of the die is different from the distance of the guideway from the center of the base. Hence a wide variation in the radial distances of the holes in the die is possible, and it becomes possible to make the dies in quantities by standard methods of production, and all duplicates of one another, at least as to dies for staking tools of the same style and size. The expensive special adjusting in course of manufacture, heretofore necessary, is now avoided, and in particular, the making of repairs of staking tools in the hands of their users is greatly simplified, since the user can substitute a duplicate interchangeable die for a worn out or broken one without needing to have the die specially fitted and without losing the use of the tool in the meantime.

What I claim and desire to secure by Letters Patent is:

1. In a staking tool, a frame comprising a base having an overhanging head and a guideway, a die resting on the base, and a combined pivot and clamping means for the die constructed with provision permitting movements of the die bodily transversely to its pivotal axis.

2. In a staking tool, a base, a die resting on said base, and a combined pivot and clamping means for the die constructed with means permitting lateral translative displacement of the die.

3. A staking tool comprising a base, a die supported on said base, a pivot about which said die is adapted to rotate, a clamping bar engaged with said pivot, and clamping means arranged to apply force to said bar in the direction for binding the die against the base, said pivot and bar having an interlocking connection constructed to permit transverse movement of one relatively to the other.

4. In a staking tool, a base, a die supported on the base, a pivot stud about which the die is rotatable, a bar arranged in approximate alinement with said pivot but having a transverse guideway interlocked with said pivot in a manner permitting relative transverse movement of the latter, and clamping means arranged to coact with said bar so as to bind the die against the base.

5. In a staking tool, a base, a die supported on the base, a pivot stud passing through the die into the base and having a disk on its lower end, a bar in approximate alinement with said pivot stud having a transverse slot in its upper end, and overhanging lips, respectively receiving and overlapping said disk with provision for transverse movement of one relatively to the other, and means for drawing down or releasing said bar so as to bind or release the die.

In testimony whereof I have affixed my signature.

LESTER J. WILLIAMS.